(12) United States Patent
Somani et al.

(10) Patent No.: US 11,300,983 B2
(45) Date of Patent: *Apr. 12, 2022

(54) SYSTEMS AND METHODS FOR FLOW SENSOR BACK PRESSURE ADJUSTMENT FOR MASS FLOW CONTROLLER

(71) Applicant: FLOW DEVICES AND SYSTEMS INC., Yorba Linda, CA (US)

(72) Inventors: Bhushan Somani, Yorba Linda, CA (US); Christophe Ellec, Yorba Linda, CA (US); Eric J. Redemann, Yorba Linda, CA (US)

(73) Assignee: FLOW DEVICES AND SYSTEMS INC., Yorba Linda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/226,000

(22) Filed: Apr. 8, 2021

(65) Prior Publication Data

US 2021/0223798 A1    Jul. 22, 2021

Related U.S. Application Data

(63) Continuation of application No. 15/907,254, filed on Feb. 27, 2018, now Pat. No. 10,983,538.

(60) Provisional application No. 62/464,251, filed on Feb. 27, 2017.

(51) Int. Cl.
| | | |
|---|---|---|
| *G05D 7/06* | (2006.01) | |
| *G01F 1/684* | (2006.01) | |
| *G01F 15/00* | (2006.01) | |
| *G05D 16/00* | (2006.01) | |
| *G01F 1/36* | (2006.01) | |
| *G01F 1/86* | (2006.01) | |
| *G01F 1/88* | (2006.01) | |

(52) U.S. Cl.
CPC ............. *G05D 7/0623* (2013.01); *G01F 1/36* (2013.01); *G01F 1/6842* (2013.01); *G01F 1/86* (2013.01); *G01F 1/88* (2013.01); *G01F 15/005* (2013.01); *G05D 7/0647* (2013.01); *G05D 16/00* (2013.01); *G05D 16/024* (2019.01)

(58) Field of Classification Search
CPC .. G05D 7/0623; G05D 7/0647; G05D 16/024; G05D 16/028; G01F 1/36; G01F 1/6842; G01F 1/88
See application file for complete search history.

(56) References Cited

U.S. PATENT DOCUMENTS

| | | |
|---|---|---|
| 3,973,657 A | 8/1976 | Darling |
| 4,228,791 A | 10/1980 | Hirai et al. |
| 4,469,801 A | 9/1984 | Hirai et al. |

(Continued)

*Primary Examiner* — Paul M. West
(74) *Attorney, Agent, or Firm* — Mahesh Law Group PC; Kumar Maheshwari

(57) ABSTRACT

A mass flow control apparatus comprising a proportional valve upstream of a flow measurement portion, a pressure sensing element fluidly connected to determine a fluid pressure downstream of the flow measurement portion, and a dynamically adjustable variable valve downstream of the flow measurement portion and adjacent to the pressure sensing element connection. Fluid conductance of the variable valve is adjusted according to a control scheme based upon limitations of the flow measurement portion. Integral flow verification may be enabled with additional fluid pathway elements upstream of the flow measurement portion.

20 Claims, 10 Drawing Sheets

(56) References Cited

U.S. PATENT DOCUMENTS

| | | |
|---|---|---|
| 4,552,669 A | 11/1985 | Sekellick |
| 4,565,747 A | 1/1986 | Nakae et al. |
| 4,645,176 A | 2/1987 | Ogawa et al. |
| 4,666,126 A | 5/1987 | Tujimura et al. |
| 4,695,034 A | 9/1987 | Shimizu et al. |
| 4,750,524 A | 6/1988 | Sekoguchi et al. |
| 4,751,099 A | 6/1988 | Niino et al. |
| 4,763,874 A | 8/1988 | Ogawa |
| 4,772,304 A | 9/1988 | Nakae et al. |
| 4,804,164 A | 2/1989 | Nakazawa et al. |
| 4,900,526 A | 2/1990 | Matsuda et al. |
| 4,940,851 A | 7/1990 | Oyobe et al. |
| 4,947,889 A | 8/1990 | Ishikawa et al. |
| 4,977,916 A | 12/1990 | Ohmi et al. |
| 5,045,356 A | 9/1991 | Uemura et al. |
| 5,048,332 A | 9/1991 | Ishikawa et al. |
| 5,114,447 A | 5/1992 | Davis |
| 5,122,312 A | 6/1992 | Tomalesky |
| 5,129,418 A | 7/1992 | Shimomura et al. |
| 5,141,021 A | 8/1992 | Shimomura et al. |
| 5,145,147 A | 9/1992 | Nakazawa et al. |
| 5,160,542 A | 11/1992 | Mihira et al. |
| 5,319,134 A | 6/1994 | Hirai |
| 5,351,936 A | 10/1994 | Tanikawa et al. |
| 5,377,616 A | 1/1995 | Mihira et al. |
| 5,398,725 A | 3/1995 | Nakazawa et al. |
| 5,429,998 A | 7/1995 | Someno et al. |
| 5,516,075 A | 5/1996 | Itoi et al. |
| 5,520,001 A | 5/1996 | Miyamoto et al. |
| 5,579,244 A | 11/1996 | Brown |
| 5,606,994 A | 3/1997 | Tanikawa et al. |
| 5,630,878 A | 5/1997 | Miyamoto et al. |
| 5,634,627 A | 6/1997 | Daido et al. |
| 5,669,408 A | 9/1997 | Nishino et al. |
| 5,669,596 A | 9/1997 | Yoshikawa et al. |
| 5,678,803 A | 10/1997 | Shinohara et al. |
| 5,769,110 A | 6/1998 | Ohmi et al. |
| 5,771,919 A | 6/1998 | Itoi et al. |
| 5,778,968 A | 7/1998 | Hendrickson et al. |
| 5,791,369 A | 8/1998 | Nishino et al. |
| 5,810,928 A | 9/1998 | Harada et al. |
| 5,816,285 A | 10/1998 | Ohmi et al. |
| 5,850,853 A | 12/1998 | Ohmi et al. |
| 5,865,205 A | 2/1999 | Wilmer |
| 5,881,997 A | 3/1999 | Ogawa et al. |
| 5,901,984 A | 5/1999 | Nishikawa |
| 5,904,381 A | 5/1999 | Ohmi et al. |
| 5,913,504 A | 6/1999 | Nishimura et al. |
| 5,917,066 A | 6/1999 | Eisenmann et al. |
| 5,937,263 A | 8/1999 | Eisenmann et al. |
| 5,950,675 A | 9/1999 | Minami et al. |
| 5,967,489 A | 10/1999 | Nakazawa et al. |
| 5,975,112 A | 11/1999 | Ohmi et al. |
| 5,979,944 A | 11/1999 | Yokoyama et al. |
| 5,983,933 A | 11/1999 | Ohmi et al. |
| 5,988,210 A | 11/1999 | Komiya et al. |
| 5,988,217 A | 11/1999 | Ohmi et al. |
| 6,006,701 A | 12/1999 | Nagano |
| 6,007,307 A | 12/1999 | Sonoda |
| 6,012,474 A | 1/2000 | Takamoto et al. |
| 6,039,360 A | 3/2000 | Ohmi et al. |
| 6,080,219 A | 6/2000 | Jha et al. |
| 6,093,662 A | 7/2000 | Ohmi et al. |
| 6,102,640 A | 8/2000 | Yokoyama et al. |
| 6,116,092 A | 9/2000 | Ohmi et al. |
| 6,116,282 A | 9/2000 | Yamaji et al. |
| 6,116,283 A | 9/2000 | Yamaji et al. |
| 6,119,710 A | 9/2000 | Brown |
| 6,135,155 A | 10/2000 | Ohmi et al. |
| 6,149,718 A | 11/2000 | Cowan et al. |
| 6,152,162 A | 11/2000 | Balazy et al. |
| 6,152,168 A | 11/2000 | Ohmi et al. |
| 6,158,679 A | 12/2000 | Ohmi et al. |
| 6,161,875 A | 12/2000 | Yamaji et al. |
| 6,178,995 B1 | 1/2001 | Ohmi et al. |
| 6,180,067 B1 | 1/2001 | Ohmi et al. |
| 6,193,212 B1 | 2/2001 | Ohmi et al. |
| 6,199,260 B1 | 3/2001 | Ohmi et al. |
| 6,210,482 B1 | 4/2001 | Kitayama et al. |
| 6,216,726 B1 | 4/2001 | Brown et al. |
| 6,237,635 B1 | 5/2001 | Nambu |
| 6,244,562 B1 | 6/2001 | Ejiri |
| 6,244,563 B1 | 6/2001 | Ejiri |
| 6,247,495 B1 | 6/2001 | Yamamoto et al. |
| 6,257,270 B1 | 7/2001 | Ohmi et al. |
| 6,274,098 B1 | 8/2001 | Tanabe et al. |
| 6,289,923 B1 | 9/2001 | Ohmi et al. |
| 6,302,130 B1 | 10/2001 | Ohmi et al. |
| 6,314,992 B1 | 11/2001 | Ohmi et al. |
| 6,334,962 B1 | 1/2002 | Minami et al. |
| 6,360,762 B2 | 3/2002 | Kitayama et al. |
| 6,361,081 B1 | 3/2002 | Yokoyama et al. |
| 6,378,192 B1 | 4/2002 | Ohmi et al. |
| 6,379,035 B1 | 4/2002 | Kubo et al. |
| 6,382,238 B2 | 5/2002 | Ishii et al. |
| 6,387,158 B1 | 5/2002 | Ikeda et al. |
| 6,394,415 B1 | 5/2002 | Ohmi et al. |
| 6,422,256 B1 | 7/2002 | Balazy et al. |
| 6,422,264 B2 | 7/2002 | Ohmi et al. |
| 6,441,350 B1 | 8/2002 | Stoddard et al. |
| 6,450,190 B2 | 9/2002 | Ohmi et al. |
| 6,505,814 B1 | 1/2003 | Satou et al. |
| 6,517,362 B2 | 2/2003 | Hirai et al. |
| 6,539,968 B1 | 4/2003 | White et al. |
| 6,561,218 B2 | 5/2003 | Mudd |
| 6,563,072 B1 | 5/2003 | Ohmi et al. |
| 6,604,493 B1 | 8/2003 | Toki |
| 6,606,912 B2 | 8/2003 | Ohmi et al. |
| 6,615,871 B2 | 9/2003 | Morokoshi et al. |
| 6,618,922 B2 | 9/2003 | Ohmi et al. |
| 6,704,696 B1 | 3/2004 | Kuramochi et al. |
| 6,719,947 B1 | 4/2004 | Jha et al. |
| 6,733,732 B2 | 5/2004 | Ohmi et al. |
| 6,752,376 B1 | 6/2004 | Satou et al. |
| 6,752,387 B1 | 6/2004 | Nishizato et al. |
| 6,763,581 B2 | 7/2004 | Hirai et al. |
| 6,779,774 B2 | 8/2004 | Itoi |
| 6,786,471 B2 | 9/2004 | Nakata et al. |
| 6,802,333 B2 | 10/2004 | Balazy et al. |
| 6,820,632 B2 | 11/2004 | Ohmi et al. |
| 6,837,112 B2 | 1/2005 | Ferran et al. |
| 6,848,470 B2 | 2/2005 | Ohmi et al. |
| 6,868,867 B2 | 3/2005 | Yamaji et al. |
| 6,871,803 B1 | 3/2005 | Ohmi et al. |
| 6,933,233 B2 | 8/2005 | Yonebayashi et al. |
| 6,938,489 B2 | 9/2005 | Esashi et al. |
| 6,964,279 B2 | 11/2005 | Ohmi et al. |
| 7,059,363 B2 | 6/2006 | Sugiyama et al. |
| 7,080,658 B2 | 7/2006 | Ohmi et al. |
| 7,085,628 B2 | 8/2006 | Ohmi et al. |
| 7,087,158 B2 | 8/2006 | Miyamoto et al. |
| 7,087,443 B2 | 8/2006 | Hornberg et al. |
| 7,103,990 B2 | 9/2006 | Ohmi et al. |
| 7,111,467 B2 | 9/2006 | Apparao et al. |
| 7,112,234 B2 | 9/2006 | Jha et al. |
| 7,115,186 B2 | 10/2006 | Miyamoto et al. |
| 7,127,901 B2 | 10/2006 | Dresens et al. |
| 7,150,287 B2 | 12/2006 | Kita et al. |
| 7,150,444 B2 | 12/2006 | Ohmi et al. |
| 7,175,157 B2 | 2/2007 | Tanikawa et al. |
| 7,185,543 B2 | 3/2007 | Sekoguchi |
| 7,204,158 B2 | 4/2007 | Morgan |
| 7,219,533 B2 | 5/2007 | Ohmi et al. |
| 7,234,310 B2 | 6/2007 | Flynn et al. |
| 7,258,845 B2 | 8/2007 | Ohmi et al. |
| 7,278,437 B2 | 10/2007 | Ohmi et al. |
| 7,289,863 B2 | 10/2007 | Arruda et al. |
| 7,361,300 B2 | 4/2008 | Kelly et al. |
| 7,363,810 B2 | 4/2008 | Ikeda et al. |
| 7,367,241 B2 | 5/2008 | Ohmi et al. |
| 7,368,092 B2 | 5/2008 | Ohmi et al. |
| 7,377,152 B2 | 5/2008 | Brekelmans et al. |
| 7,416,165 B2 | 8/2008 | Ohmi et al. |
| 7,431,045 B2 | 10/2008 | Mudd et al. |

(56) References Cited

U.S. PATENT DOCUMENTS

| | | |
|---|---|---|
| 7,472,887 B2 | 1/2009 | Ohmi et al. |
| 7,478,540 B2 | 1/2009 | Flynn et al. |
| 7,490,483 B2 | 2/2009 | Boiarski et al. |
| 7,497,482 B2 | 3/2009 | Sugiyama et al. |
| 7,552,617 B2 | 6/2009 | Danilchik |
| 7,553,459 B2 | 6/2009 | Ohmi et al. |
| 7,590,498 B1 | 9/2009 | Chung et al. |
| 7,594,517 B2 | 9/2009 | Kannan et al. |
| 7,636,640 B2 | 12/2009 | Wang et al. |
| 7,654,137 B2 | 2/2010 | Hirata et al. |
| 7,669,455 B2 | 3/2010 | Ohmi et al. |
| 7,677,528 B2 | 3/2010 | Shinohara et al. |
| 7,680,399 B2 | 3/2010 | Buchanan et al. |
| 7,695,984 B1 | 4/2010 | Monkowski et al. |
| 7,699,573 B2 | 4/2010 | Blattner et al. |
| 7,748,268 B2 | 7/2010 | Lull et al. |
| 7,757,541 B1 | 7/2010 | Monkowski et al. |
| 7,788,942 B2 | 9/2010 | Dresens et al. |
| 7,798,167 B2 | 9/2010 | Ohmi et al. |
| 7,802,482 B2 | 9/2010 | Ikeda |
| 7,814,797 B2 | 10/2010 | Shikata et al. |
| 7,815,872 B2 | 10/2010 | Nariai et al. |
| 7,823,436 B2 | 11/2010 | Monkowski et al. |
| 7,833,329 B2 | 11/2010 | Mahon, III et al. |
| 7,835,791 B2 | 11/2010 | Sunagawa et al. |
| 7,841,628 B2 | 11/2010 | Tokuda et al. |
| 7,849,869 B2 | 12/2010 | Ohmi et al. |
| 7,871,830 B2 | 1/2011 | Johal et al. |
| 7,873,052 B2 | 1/2011 | Chung et al. |
| 7,874,208 B2 | 1/2011 | Redemann et al. |
| 7,881,829 B2 | 2/2011 | Yoneda et al. |
| 7,890,194 B2 | 2/2011 | Pannese |
| 7,896,030 B2 | 3/2011 | Shinohara et al. |
| 7,905,139 B2 | 3/2011 | Lull |
| 7,926,509 B2 | 4/2011 | Ohmi et al. |
| 7,937,232 B1 | 5/2011 | Chow et al. |
| 7,940,395 B2 | 5/2011 | Monkowski et al. |
| 7,941,284 B1 | 5/2011 | Glaudel |
| 7,945,414 B2 | 5/2011 | Nagase et al. |
| 7,962,216 B2 | 6/2011 | Sunagawa et al. |
| 7,979,165 B2 | 7/2011 | Gotoh |
| 7,988,130 B2 | 8/2011 | Ohmi et al. |
| 7,991,510 B2 | 8/2011 | Duan et al. |
| 8,000,791 B2 | 8/2011 | Sunagawa et al. |
| 8,010,195 B2 | 8/2011 | Sunagawa et al. |
| 8,010,199 B2 | 8/2011 | Sunagawa et al. |
| 8,010,303 B2 | 8/2011 | Wang et al. |
| 8,019,481 B2 | 9/2011 | Yamaguchi et al. |
| 8,020,574 B2 | 9/2011 | Ohmi et al. |
| 8,027,729 B2 | 9/2011 | Sunagawa et al. |
| 8,042,573 B2 | 10/2011 | Tokuda et al. |
| 8,047,225 B2 | 11/2011 | Ohmi et al. |
| 8,047,510 B2 | 11/2011 | Hirata et al. |
| 8,056,579 B2 | 11/2011 | Takahashi et al. |
| 8,068,999 B2 | 11/2011 | Wang et al. |
| 8,091,381 B2 | 1/2012 | Boiarski et al. |
| 8,097,071 B2 | 1/2012 | Burgess et al. |
| 8,102,844 B1 | 1/2012 | Nelson et al. |
| 8,104,323 B2 | 1/2012 | Yasuda |
| 8,112,171 B2 | 2/2012 | Krupyshev |
| 8,118,054 B2 | 2/2012 | Glaudel et al. |
| 8,141,430 B2 | 3/2012 | Fortner et al. |
| 8,162,286 B2 | 4/2012 | Sawada et al. |
| 8,181,932 B2 | 5/2012 | Matsumoto et al. |
| 8,195,418 B2 | 6/2012 | Borenstein |
| 8,196,609 B2 | 6/2012 | Oya et al. |
| 8,197,133 B2 | 6/2012 | Schultz et al. |
| 8,210,022 B2 | 7/2012 | Moriya et al. |
| 8,210,493 B2 | 7/2012 | Miyagawa et al. |
| 8,219,329 B2 | 7/2012 | Ebi et al. |
| 8,220,495 B2 | 7/2012 | Nakata et al. |
| 8,237,928 B2 | 8/2012 | Monkowski et al. |
| 8,240,324 B2 | 8/2012 | Monkowski et al. |
| 8,246,087 B1 | 8/2012 | Yamaji et al. |
| 8,256,744 B2 | 9/2012 | Tanikawa et al. |
| 8,261,562 B2 | 9/2012 | Dresens et al. |
| 8,265,795 B2 | 9/2012 | Takahashi et al. |
| 8,265,888 B2 | 9/2012 | Chung et al. |
| 8,267,634 B2 | 9/2012 | Bufano et al. |
| 8,271,210 B2 | 9/2012 | Chung et al. |
| 8,271,211 B2 | 9/2012 | Chung et al. |
| 8,280,235 B2 | 10/2012 | Nishikawa et al. |
| 8,281,816 B2 | 10/2012 | Nakata et al. |
| 8,327,876 B2 | 12/2012 | Koyomogi |
| 8,328,495 B2 | 12/2012 | Bufano et al. |
| 8,340,749 B2 | 12/2012 | Sugimachi et al. |
| 8,356,623 B2 | 1/2013 | Isobe et al. |
| 8,381,755 B2 | 2/2013 | Moriya et al. |
| 8,393,197 B2 | 3/2013 | Monkowski et al. |
| 8,408,044 B2 | 4/2013 | Danilchik |
| 8,413,452 B2 | 4/2013 | Morris et al. |
| 8,418,714 B2 | 4/2013 | Ohmi et al. |
| 8,425,172 B2 | 4/2013 | Blattner et al. |
| 8,429,979 B2 | 4/2013 | Kuwahara et al. |
| 8,434,507 B2 | 5/2013 | Iida et al. |
| 8,434,522 B2 | 5/2013 | Okase et al. |
| 8,443,649 B2 | 5/2013 | Yasuda et al. |
| 8,443,830 B2 | 5/2013 | Tanikawa et al. |
| 8,459,290 B2 | 6/2013 | Minami et al. |
| 8,459,291 B2 | 6/2013 | Minami et al. |
| 8,469,046 B2 | 6/2013 | Minami et al. |
| 8,496,022 B2 | 7/2013 | Sugiyama et al. |
| 8,504,318 B2 | 8/2013 | Mendelson et al. |
| 8,509,938 B2 | 8/2013 | Krupyshev |
| 8,511,169 B2 | 8/2013 | Fortner et al. |
| 8,544,828 B2 | 10/2013 | Miyamoto et al. |
| 8,555,920 B2 | 10/2013 | Hirata et al. |
| 8,561,966 B2 | 10/2013 | Dohi et al. |
| 8,587,180 B2 | 11/2013 | Sugita et al. |
| 8,589,107 B2 | 11/2013 | Borenstein |
| 8,601,976 B2 | 12/2013 | Nishino et al. |
| 8,606,412 B2 | 12/2013 | Nagase et al. |
| 8,646,307 B2 | 2/2014 | Yasuda et al. |
| 8,648,604 B2 | 2/2014 | Brucker |
| 8,661,919 B2 | 3/2014 | Oba et al. |
| 8,667,830 B2 | 3/2014 | Monkowski et al. |
| 8,673,065 B2 | 3/2014 | Burgess et al. |
| 8,714,188 B2 | 5/2014 | Ohmi et al. |
| 8,718,984 B2 | 5/2014 | Sekoguchi |
| 8,724,974 B2 | 5/2014 | Ohmi et al. |
| 8,726,923 B2 | 5/2014 | Daido et al. |
| 8,744,784 B2 | 6/2014 | Yasuda et al. |
| 8,746,057 B2 | 6/2014 | Yasuda et al. |
| 8,751,180 B2 | 6/2014 | Lull et al. |
| 8,755,679 B2 | 6/2014 | Nishikawa et al. |
| 8,757,197 B2 | 6/2014 | Hirata et al. |
| 8,763,928 B2 | 7/2014 | Nishikawa et al. |
| 8,789,556 B2 | 7/2014 | Yasuda et al. |
| 8,800,589 B2 | 8/2014 | Minami et al. |
| 8,820,360 B2 | 9/2014 | Oya et al. |
| 8,833,730 B2 | 9/2014 | Sawada et al. |
| 8,844,901 B2 | 9/2014 | Hayashi |
| 8,851,105 B2 | 10/2014 | Kashima et al. |
| 8,857,456 B2 | 10/2014 | Monkowski et al. |
| 8,869,552 B2 | 10/2014 | Dresens et al. |
| 8,887,549 B2 | 11/2014 | Mendelson et al. |
| 8,910,656 B2 | 12/2014 | Yasuda |
| 8,918,203 B2 | 12/2014 | Gilchrist et al. |
| 8,931,506 B2 | 1/2015 | Nagata et al. |
| 8,965,714 B2 | 2/2015 | Yamaguchi et al. |
| 8,967,200 B2 | 3/2015 | Hayashi |
| 8,979,137 B2 | 3/2015 | Kimura et al. |
| 9,010,369 B2 | 4/2015 | Ohmi et al. |
| 9,038,663 B2 | 5/2015 | Dohi et al. |
| 9,057,636 B2 | 6/2015 | Nagai |
| 9,075,414 B2 | 7/2015 | Takijiri |
| 9,081,388 B2 | 7/2015 | Tanaka et al. |
| 9,091,380 B2 | 7/2015 | Hayashi et al. |
| 9,098,082 B2 | 8/2015 | Sugiyama et al. |
| 9,103,366 B2 | 8/2015 | Amikura et al. |
| 9,109,736 B2 | 8/2015 | Yada et al. |
| 9,116,526 B2 | 8/2015 | Hashimoto et al. |
| 9,127,796 B2 | 9/2015 | Hirose et al. |
| 9,133,951 B2 | 9/2015 | Ohmi et al. |

(56) References Cited

U.S. PATENT DOCUMENTS

| | | |
|---|---|---|
| 9,149,750 B2 | 10/2015 | Steele et al. |
| 9,163,743 B2 | 10/2015 | Hidaka et al. |
| 9,163,748 B2 | 10/2015 | Hirose et al. |
| 9,163,969 B2 | 10/2015 | Sawada et al. |
| 9,169,558 B2 | 10/2015 | Hirose et al. |
| 9,169,940 B2 | 10/2015 | Yogo et al. |
| 9,188,990 B2 | 11/2015 | Yasuda |
| 9,212,755 B2 | 12/2015 | Kuriki et al. |
| 9,223,318 B2 | 12/2015 | Takeuchi et al. |
| 9,224,628 B2 | 12/2015 | Bufano et al. |
| 9,230,841 B2 | 1/2016 | Gilchrist et al. |
| 9,233,347 B2 | 1/2016 | Nagase et al. |
| 9,261,884 B2 | 2/2016 | Sawada et al. |
| 9,266,039 B2 | 2/2016 | Eacobacci, Jr. et al. |
| 9,274,091 B2 | 3/2016 | Danilchik |
| 9,285,079 B2 | 3/2016 | Yamaguchi et al. |
| 9,304,030 B2 | 4/2016 | Tanaka et al. |
| 9,308,584 B2 | 4/2016 | Burgess et al. |
| 9,328,826 B2 | 5/2016 | Hayashi |
| 9,334,859 B2 | 5/2016 | Dresens et al. |
| 9,454,158 B2 | 9/2016 | Somani |
| 10,983,537 B2 | 4/2021 | Somani |
| 10,983,538 B2 * | 4/2021 | Somani ............... G05D 7/0166 |
| 2002/0046612 A1 | 4/2002 | Mudd |
| 2011/0160917 A1 | 6/2011 | Snowbarger |
| 2012/0197446 A1 | 8/2012 | Glaudel |
| 2015/0241264 A1 | 8/2015 | Nagai |
| 2016/0018829 A1 | 1/2016 | Ellec |
| 2016/0252912 A1 | 9/2016 | Horwitz |
| 2017/0010625 A1 | 1/2017 | Monkowski et al. |
| 2017/0072360 A1 | 3/2017 | Nasato |
| 2017/0199529 A1 | 7/2017 | Ding |
| 2018/0246533 A1 | 8/2018 | Somani et al. |
| 2019/0204128 A1 | 7/2019 | Somani et al. |
| 2020/0018736 A1 | 1/2020 | Nagase et al. |
| 2020/0042021 A1 | 2/2020 | Somani |
| 2020/0319658 A1 | 10/2020 | Somani et al. |

* cited by examiner

SYSTEMS AND METHODS FOR FLOW SENSOR BACK PRESSURE ADJUSTMENT FOR MASS FLOW CONTROLLER

PRIORITY CLAIM TO RELATED APPLICATIONS

This application is a continuation of U.S. patent application Ser. No. 15/907,254, filed Feb. 27, 2018, entitled as "SYSTEMS AND METHODS FOR FLOW SENSOR BACK PRESSURE ADJUSTMENT FOR MASS FLOW CONTROLLER", which claimed the benefit of U.S. Provisional Patent Application No. 62/464,251, filed Feb. 27, 2017, entitled as "Systems, Apparatus and Methods for Flow Sensor Back Pressure Adjustment for Mass Flow Control", the disclosures of which are incorporated by reference in their entirety.

BACKGROUND

Various embodiments relate to mass flow control apparatus. Mass flow controller may operate by modulating a fluid pressure. Fluid as used herein is intended to encompass materials which are in a gaseous phase because of specific combinations of pressure and temperature despite whether such materials are gaseous under everyday circumstances. Thus, fluids may include water vapor or boron trichloride (BCl3), for example, along with common gaseous materials such as silane (SiH4), argon, nitrogen, etc. The embodiments described below relate to determining the present flow conditions at a flow restriction in a fluid flow pathway to ascertain whether or not a chosen flow control algorithm is valid for those present conditions. At various times, a low fluid flow rate may be required while a silicon manufacturing chamber may also provide back pressure. Providing a low fluid flow rate in a backpressure environment may be challenging. Various embodiments described below are directed to addressing issues related to low flow conditions with back pressure from the upstream direction.

SUMMARY

In consideration of the foregoing applicant has invented a fluid mass flow control apparatus comprising three valves, a flow restriction, and provisions for determining three different fluid pressures and at least one temperature.

In accordance with one embodiment, a mass flow control apparatus is provided that includes a control module configured to receive a first set point for delivering a fluid delivery to a tool, responsive to the control module receiving a second set point that is significantly lower than a first set point, a variable control valve located downstream from the flow restrictor and downstream from a first pressure sensor configured to constrict to reduce the flow of the fluid responsive to receiving the second set point. The mass flow controller apparatus further including solenoid type valve as a variable control valve. The variable control valve is configured to control the downstream pressure from the flow restrictor. A second pressure sensor located upstream from the variable control valve, the second pressure sensor configured to measure back pressure from the tool. The variable control valve constricts sufficiently to increase the pressure of the fluid from the flow restrictor to be higher than the measured back pressure from the tool and adjust the pressure to the flow restrictor such that the pressure drops across the flow restrictor to yield a flow rate that is equal to the second set point. A proportional control valve that is a solenoid valve to control the pressure to the flow restrictor and a shutoff valve including a solenoid valve to close the inlet supply to perform a rate of decay measurement operation.

In another embodiment, a mass flow control apparatus is provided that includes a proportional valve upstream of a flow measurement portion, a pressure sensing element fluidly connected to determine a fluid pressure, downstream of the flow measurement portion and a dynamically adjustable variable valve downstream of both the flow measurement portion and the pressure sensing element connection. A solenoid valve to control pressure to a flow restrictor with a proportional control valve that is a solenoid valve to control the pressure to the flow restrictor. A shutoff valve comprises a solenoid valve to close the inlet supply to perform a rate of decay measurement operation. A pressure-based flow sensor including a fluid conduit with fluidly coupled pressure and temperature sensing provisions upstream of a known flow restriction. A thermal-based flow sensor includes fluid conduit with two spaced apart temperature responsive elements affixed to the exterior of the fluid conduit. The dynamically adjustable variable valve can be adjusted to any of at least two different amounts of openings. The dynamically adjustable variable valve can be continuously adjusted to a range of openings.

In various embodiments, a mass flow control apparatus is provided that includes an inlet to a fluid pathway, a controllable shutoff valve, the controllable shutoff valve providing provisions for measuring a reference temperature (T0) and a reference pressure (P0) of a fluid contained within a reference volume of the fluid pathway, a proportional control valve, the proportional control valve providing provisions for measuring a first temperature (T1) and a first pressure (P1) of the fluid contained within the fluid pathway upstream of a flow restriction, the flow restriction providing provision for measuring a second pressure (P2) of the fluid contained within the fluid pathway downstream of the flow restriction, a variable valve and an outlet from the fluid pathway. The flow restriction is chosen from group of an orifice, a nozzle, a porous sintered metal element or a laminar flow structures. A supervision function may choose an action from group of self-calibration process, change of system parameter or storage of results.

In various embodiments, a method for a mass flow control apparatus is provided, including determining a fluid pressure downstream of a flow sensor, responding to the fluid pressure downstream and adjusting dynamically a variable valve downstream of the flow sensor to maintain desired operating conditions in the flow sensor; and maintaining and extending the useful operating range of the mass flow control apparatus. The method further including a flow verification capability. The flow verification capability including the steps of closing a shutoff valve to isolate a fluid pathway from an inlet while controlled mass flow continues through an outlet; making repeated measurements of a reference volume of a fluid pathway for a period of time, opening the shutoff valve to re-establish fluid pathway connection to the inlet, calculating a verified flow signal using pressure-volume-temperature methods; and providing a verified flow signal to a supervision function. The supervision function directs that a series of flow verification measurements be performed corresponding to different values of determined fluid pressures and fluid temperatures adjacent the flow restriction and determines a calibration curve for a discrete flow restriction based on the flow signals generated by the flow verification measurements.

A mass flow control apparatus including a control module configured to receive a first set point flow rate for delivering a fluid delivery to a tool, responsive to the control module receiving a second set point that is significantly lower that a first set point flow rate: a variable control valve located downstream from a flow restrictor and downstream from a first pressure sensor, the variable control valve configured to constrict to adjust the pressure of the fluid responsive to receiving the second set point flow rate; and a proportional control valve located upstream from the flow restrictor to adjust the pressure to the flow restrictor. In some embodiments the variable control valve is a solenoid type valve. In various embodiments, the proportional control valve is a solenoid type valve. In various embodiments, the variable control valve is configured to control the pressure downstream from the flow restrictor responsive to receiving a significantly lower second set point; and wherein significantly lower is 5% of full scale fluid flow rate. In some embodiments, significantly lower would be at least one of 60%, 65%, 70%, 75%, 80%, 85%, 90% or 95% of the previously request set point flow rate.

In various embodiments, the variable control valve constricts the fluid flow the flow path sufficiently to increase the pressure of the fluid from the flow restrictor to be higher than a back pressure from the tool and the proportional control valve is configured to adjust the pressure to the flow restrictor such that the pressure drop across the flow restrictor yields a flow rate that is equal to the second set point. In various embodiments, a reference volume may be configured to verify the actual flow rate by closing the fluid flow using a shut off valve and measuring the pressure rate of decay in the reference volume and adjusting one or both of the variable control valve or the proportional control valve until the second set point flow rate is achieved. In some embodiments, the mass flow controller may use thermal-based flow sensor and a supervision function. The mass flow control may include a thermal-based flow sensor with a fluid conduit with two spaced apart temperature responsive elements affixed to the exterior of the fluid conduit. In some embodiments, a variable control valve can be adjusted to any of at least two different amounts of openings. In some embodiments, a variable control valve can be continuously adjusted to a range of openings. In some embodiments, a the variable control valve can be adjusted to a provide a complete shut-off position. In some embodiments, a shut-off valve upstream from a reference volume, wherein the reference volume is upstream from a flow restrictor, the shut-off valve configured to close the inlet supply to perform a rate of decay operation; and wherein the shut-off valve is a solenoid type valve. In some embodiments, a first pressure sensor is configured to measure fluid pressure (P0) and a first temperature sensor is configured to measure temperature (T0) of a reference volume downstream from the shutoff valve; a proportional control valve, the proportional control valve providing provisions for measuring a second temperature (T1) and a second pressure (P1) of the fluid contained within the fluid pathway upstream of a flow restriction; the flow restriction providing provision for measuring a third pressure (P2) of the fluid contained within the fluid pathway downstream of the flow restriction; and an outlet from the fluid pathway. In some embodiments, a shut-off valve upstream from a reference volume, the reference volume is upstream from a flow restrictor, the shut-off valve configured to close the inlet supply to perform a rate of decay operation; wherein the shut-off valve is a solenoid type valve, and a proportional control valve that is a solenoid valve to control the pressure to the flow restrictor. In some embodiments, the flow restrictor is chosen from group comprising of an orifice, a nozzle, a porous sintered metal element, a laminar flow structures or tubes.

DETAILED DESCRIPTION

Figure 1A:
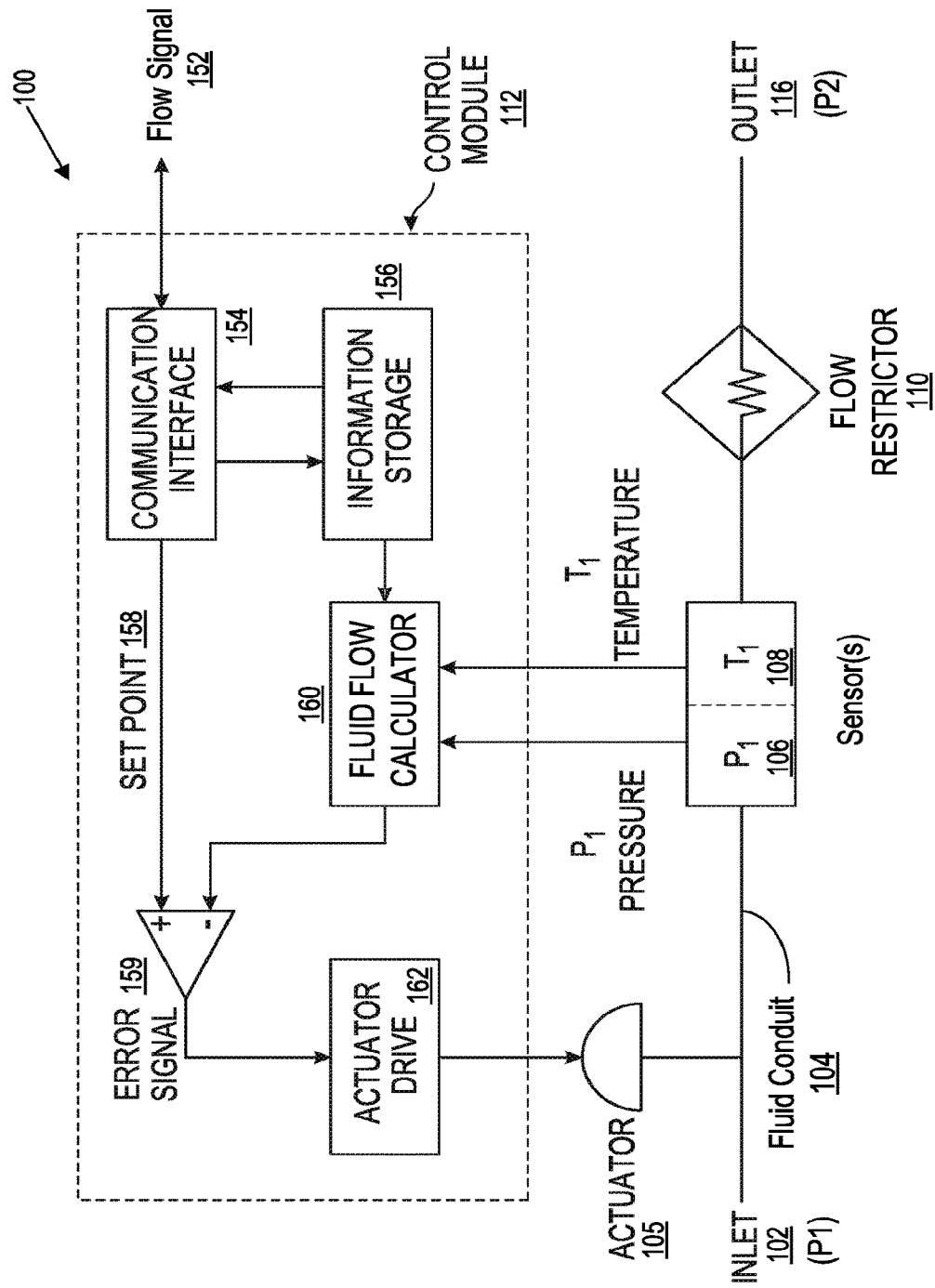
FIG. 1A is a schematic of a pressure-based flow controller.

This invention is not limited in its application to the details of construction and the arrangement of components set forth in the following description or illustrated in the drawings. The invention is capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The use of directional adjectives "inner, outer," "upper," "lower," "upstream", "downstream" and like terms, are meant to assist with understanding relative relationships among design elements and should not be construed as meaning an absolute direction in space nor regarded as limiting.

Embodiments are directed to systems and methods for a mass flow controller for responding to a request for a large reduction in flow rate or a large step down in flow rate. For example, a semiconductor manufacturing recipe may require a drop from 500 cc flow rate to drop to 25 cc. The bleed down time or the amount of time a mass flow controls takes to provide the reduction should be fast. Embodiments are directed to providing a variable control valve located downstream from each of the following elements within a mass flow controller: fluid state sensing element (including reference volume, pressure sensor and temperature sensor), proportional valve, additional pressure and temperature sensors, flow restrictor and third pressure sensor. As will be discussed in greater detail below the variable control valve may be used to achieve faster step down response times. In some embodiments, the third pressure sensor may be located downstream from the variable valve and upstream from the fluid outlet. In various embodiments, upon receiving a signal to reduce the flow rate by 80%, 85%, 90% or 95% (greater than 80% or 90%) from the previous flow rate, the variable control value may be constricted thus increasing the pressure at the pressure sensor located closest to the variable control valve. Additionally, when the variable control valve is shutoff the inlet pressure may be increased and the pressure at other pressure sensors may show an increase.

As described herein, by constricting the variable control valve the mass flow controller may be able to change its flow rate significantly while being able to conduct a rate of decay calculation. In some embodiments, the variable control valve may be a solenoid valve to control pressure to the flow restrictor (laminar flow element, orifice, hagen pouiselle tube) that may reduce cost of manufacturing. The variable valve that may be solenoid valve may act as a shutoff valve to perform a rate of decay operation to determine the flow rate. In various embodiments, the variable control valve may be a proportional control valve that is a solenoid to control the pressure to the flow restrictor and located upstream of the flow restrictor. The solenoid type proportional control valve may be used to close the inlet supply to perform a rate of decay operation.

FIG. 1A is a schematic of a pressure-based flow controller. A representative example of a pressure-based flow controller 100 (FIG. 1A) includes fluid inlet 102, a fluid conduit 104 (e.g., a bore in a larger body of material or the like), a pressure sensor 106, a temperature sensor 108, a flower restrictor 110, a control module 112, a flow signal (e.g., set point or flow rate indicator), a fluid outlet 116.

The fluid conduit 104 may be fluidly coupled to the pressure sensor 106 and temperature sensor 108 upstream of a known flow restrictor 110. The pressure sensor 106 and temperature sensor 108 may be individual elements or function as a combined single unit element. The control module 112 may receive signal from and send signals to the temperature and pressure sensors (106 and 108). The control module 112 may control the flow restrictor 110 to achieve desired flow rate by adjusting the pressure and/or temperature to achieve a flow rate. The control module 112 may determine corresponding pressure and temperature conditions for a fluid moving through the conduit 104 whereby the mass flow rate may be calculated based upon characteristics of the known flow restriction provided by the flow restrictor 110. The known flow restrictor 110 may be an orifice, nozzle, porous sintered metal element, or even a laminar flow structure such as a plurality of long narrow flow passageways. Knowledge of the pressure-temperature-flow characteristics of the flow restriction is often obtained by measurements made during a flow calibration process but other methods, such as direct measurement of mechanical dimensions, may also be feasible in some designs.

The control module 112 may include circuitry to control the various elements shown in FIG. 1A. The control module 112 may generate a flow rate signal 114 and provide excitation, sense, measure and calculate based on the received signals. In some embodiments, the control module 112 may receive a pressure measurement from the pressure sensor 106 and receive a temperature from the temperature sensor 108. The control module 112 may adjust the flow restrictor 110 based on the desired set point received from an external system. The control module 112 may be configured to use the measured pressure to determine the actual flow rate based on historical calibration information for the system 100. The pressure sensor 106 may generate a pressure P1 and generate a signal that represents a pressure to the control module 112 that controls the flow restrictor 110. The temperature sensor 108 may generate a temperature T1 and generate a signal to the control module 112 that represents a temperature T1 to the control module 150. Next the gas/fluid may pass through a flow restrictor 110 to the outlet 116.

Figure 1B:
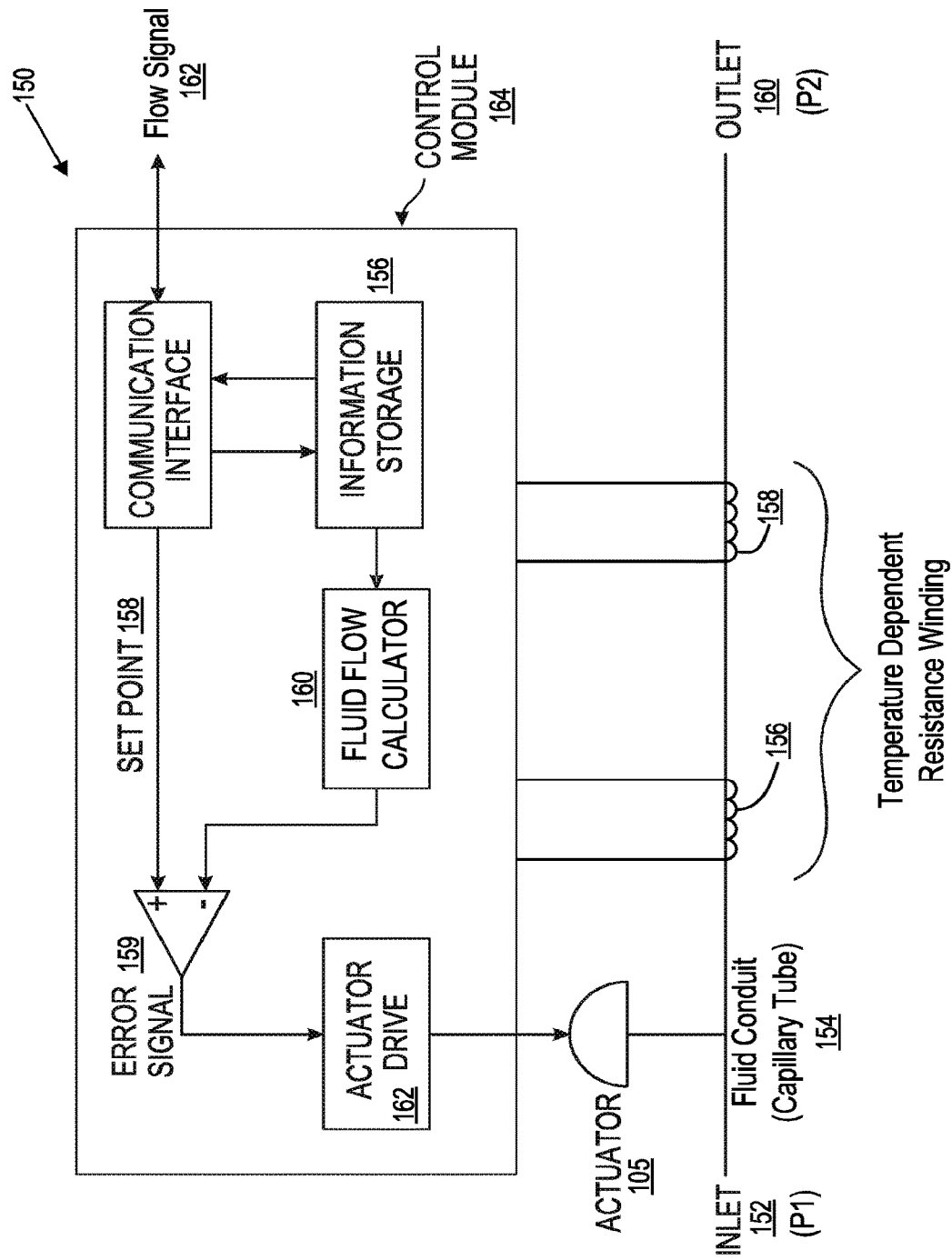
FIG. 1B is a schematic of a thermal-based flow controller.

FIG. 1B is a schematic of a thermal-based flow controller 150. A representative example of a thermal-based flow sensor (FIG. 1B) includes a fluid inlet valve 152, a fluid conduit 154 (typically a capillary tube) with two spaced apart temperature responsive elements 156 and 158 (herein illustrated as resistance windings) affixed to the exterior of the fluid conduit. Electronic circuitry in the control module 154 provides excitation to the temperature responsive elements and senses chosen properties of the elements whereby heat transfer caused by a fluid moving through the conduit 154 may be measured and a corresponding mass flow calculated. A typical mass flow meter may additionally include a known laminar flow element (not shown) fluidly coupled in parallel with the thermal-based flow sensor whereby a proportionate fluid flow passes through the laminar flow element. The control module 164 may generate a flow signal 162 that is indicative of the flow rate of the fluid through the fluid conduit 154.

Figure 2A:
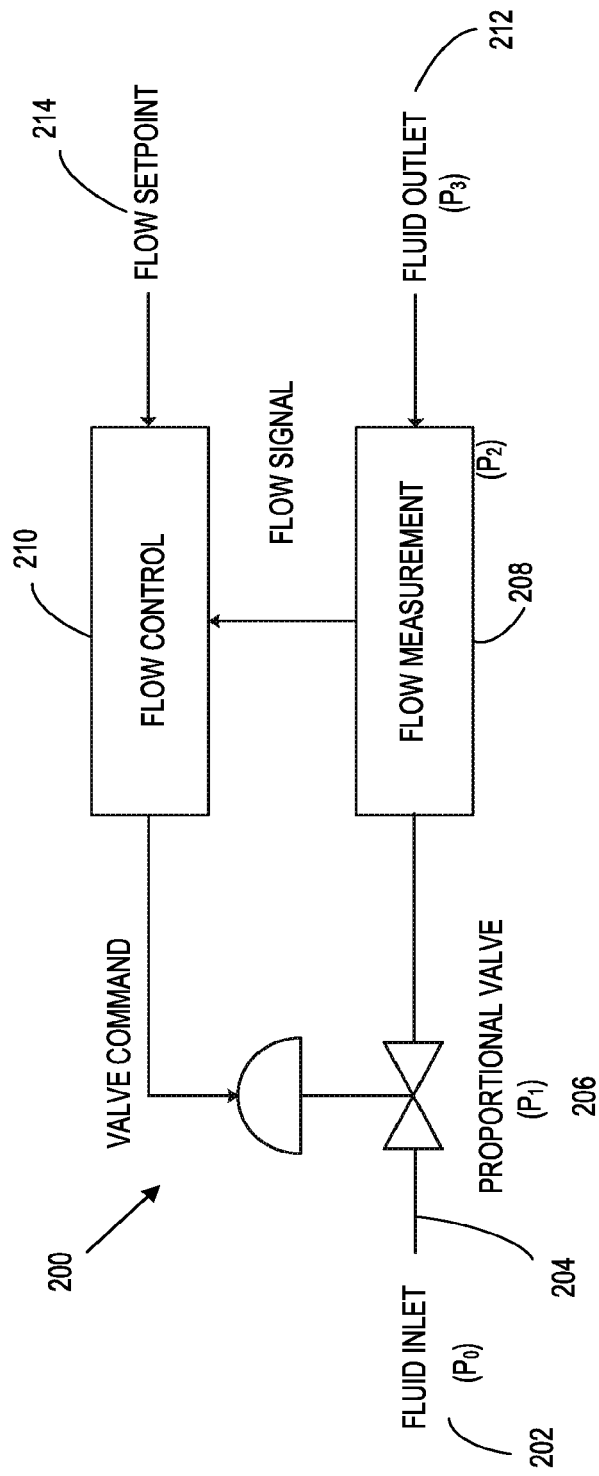
FIG. 2A is a schematic of a mass flow controller with a proportional valve upstream of a flow measurement portion.

FIG. 2A is a schematic of a mass flow controller 200 that includes a fluid inlet 202 at pressure P0, a fluid conduit 204, a proportional valve 206, a flow measurement module 208, a flow control 210, a fluid outlet 212, and a flow set point 214. The proportional valve 206 may be located upstream of a flow measurement module 208. A representative mass flow controller 200 (MFC) may include a flow measurement module 208 and a proportional valve 206 upstream (FIG. 2A) of the flow measurement module 208, the upstream valve being actively modulated by a flow control module 210 (typically electronic circuitry) to adjust the fluid flow to match a desired flow set point.

Figure 2B:
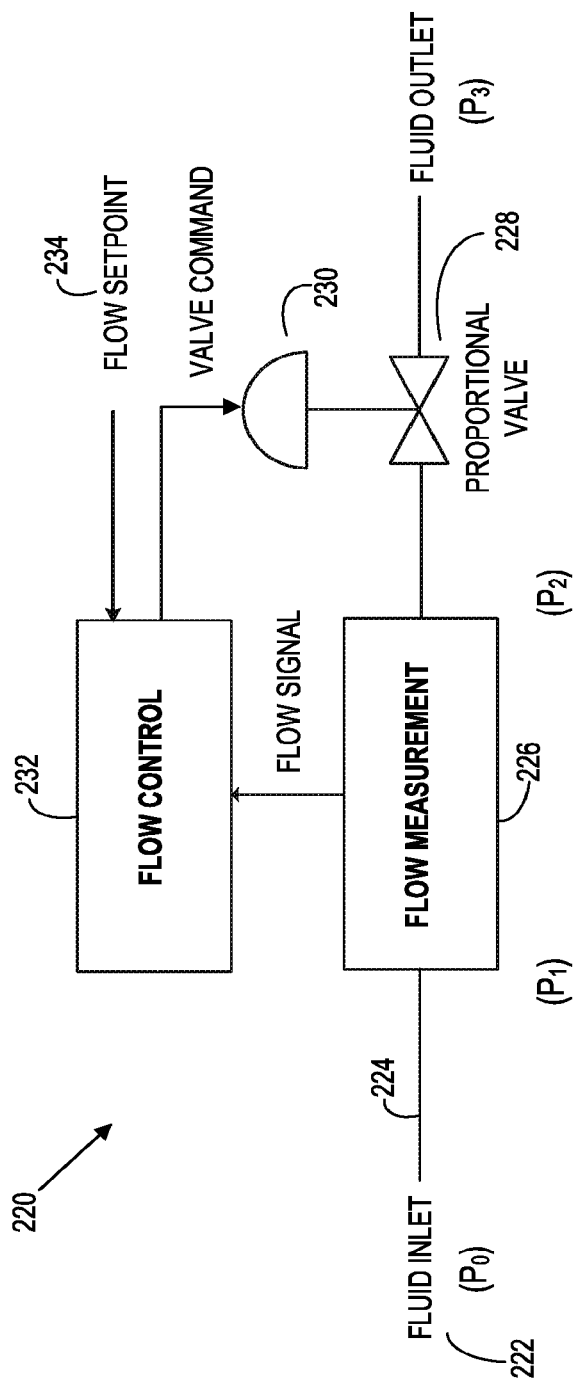
FIG. 2B is a schematic of a mass flow controller with a proportional valve downstream of a flow measurement portion.

Referring to FIG. 2B, FIG. 2B illustrates a mass flow controller 220 that includes a fluid inlet 222, a fluid conduit 224, a flow measurement module 226, a proportional valve 228, a valve command 230, a flow controller 232 and a flow set point 234. The flow measurement module 226 may include a pressure sensor, a temperature sensor. The mass flow controller 220 may include a proportional valve 228 downstream (FIG. 2B) of the flow measurement module 210, the downstream valve 228 being actively modulated by a flow control module 232 (typically electronic circuitry) to adjust the fluid flow to match a desired flow set point 234. The mass flow controller 220 arrangement with an upstream proportional valve 228 (FIG. 2A) advantageously provides the flow measurement portion some isolation from deleterious effects of pressure transients at the fluid inlet 222. In case of a thermal-based flow sensor (FIG. 1B), the upstream proportional valve MFC arrangement (FIG. 2A) may directly subject the flow sensor to very low fluid outlet pressures which may adversely change to nonlinear heat transfer caused by fluid moving through the conduit. The MFC arrangement with a downstream proportional valve 228 (FIG. 2B) advantageously provides the flow measurement portion 226 some isolation from deleterious effects of low pressure and/or pressure transients at the fluid outlet 228. However, such arrangement directly exposes the flow measurement portion 226 to the deleterious effects of pressure transients at the fluid inlet 222. In case of a pressure-based flow sensor (e.g. FIG. 1A), the downstream proportional valve arrangement (FIG. 2B) possibly makes the pressure drop across the flow restriction sub-critical. The pressure at the downstream side of the flow measurement portion 248 may be monitored (FIG. 2C) to determine whether a thermal-based flow measurement portion is operating in nonlinear conditions or whether a pressure-based flow measurement portion is operating in sub-critical conditions.

Figure 2C:
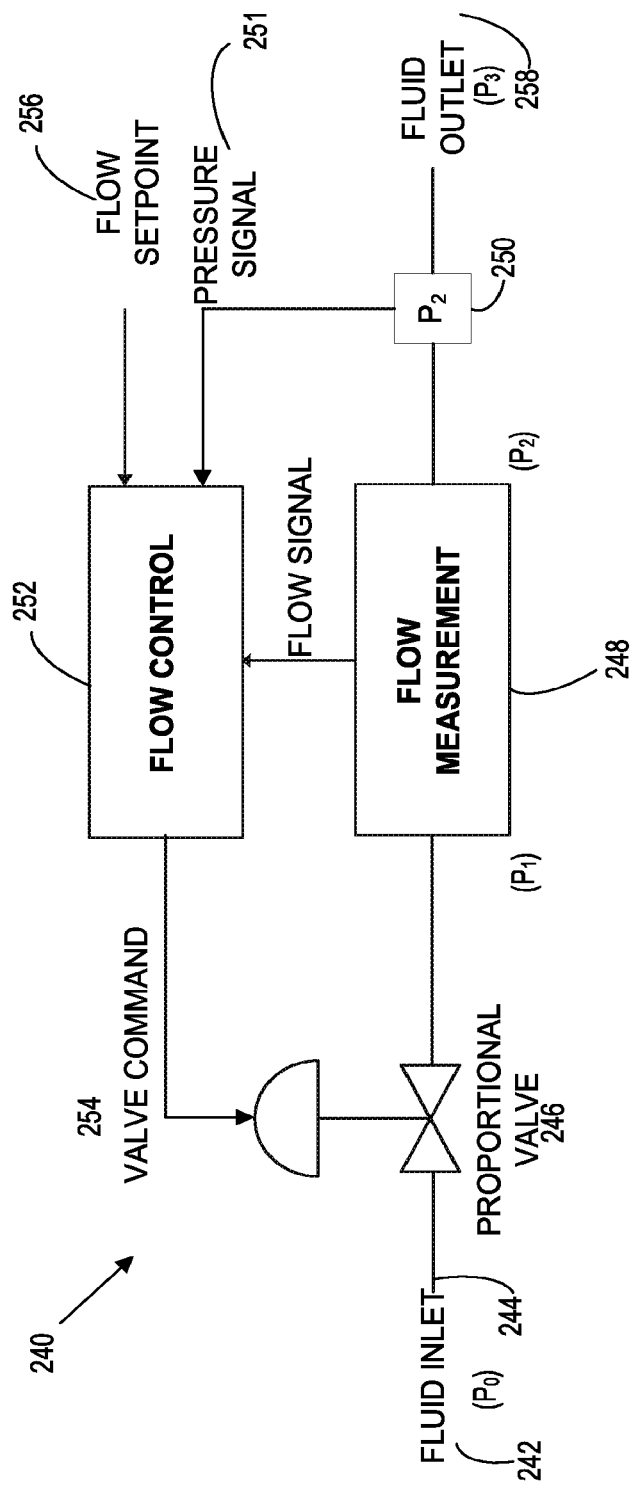
FIG. 2C is a schematic of a mass flow controller that is capable of pressure monitoring downstream of a flow measurement portion.

FIG. 2C is a schematic of a mass flow controller 240 that is capable of pressure monitoring downstream of a flow measurement portion. The mass flow controller 240 includes a fluid inlet 242, a fluid conduit 244, a proportional valve 246, a flow measurement 248, a pressure sensor 250, a flow control module 252, a valve command 254, a flow set point 256 and a fluid outlet 258. The pressure at the downstream side of the flow measurement portion 248 may be monitored (FIG. 2C) to determine whether a thermal-based flow measurement portion is operating in nonlinear conditions or whether a pressure-based flow measurement portion 248 is operating in sub-critical conditions. The flow control module 252 may be configured to receive a flow set point 256 and send commands to the proportional valve 246. Pressure sensor 250 generates a pressure signal 251 as an input to flow control 252. The flow control 252 receives the pressure signal 251 and determines the flow rate and may adjust the proportional valve 246.

Figure 3:
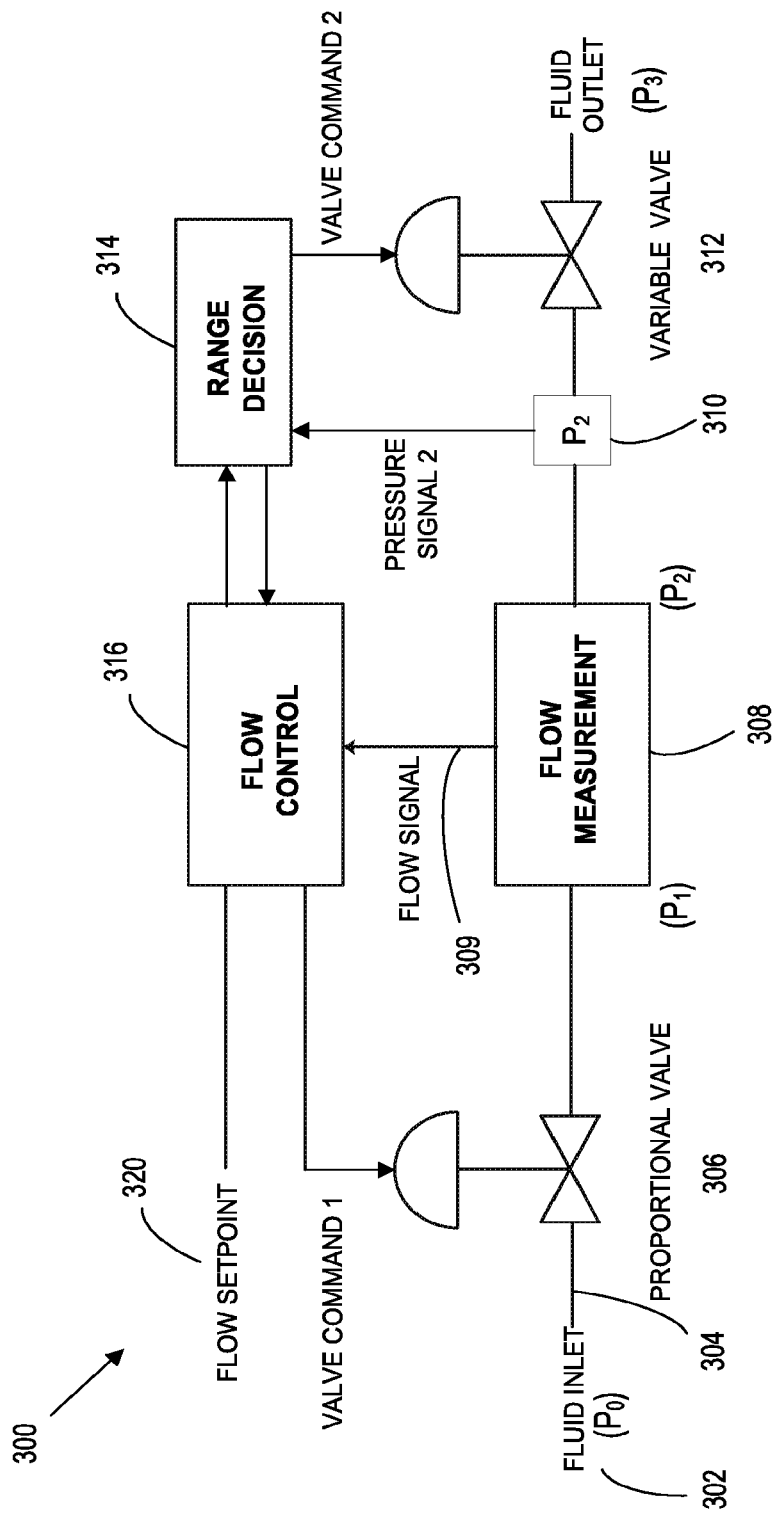
FIG. 3 is a schematic of a mass flow controller that includes a pressure sensing element connection downstream of a flow measurement portion and a dynamically adjustable variable valve further downstream of the pressure sensing element.

FIG. 3 is a schematic of a mass flow controller 300 that includes a fluid inlet 302, fluid conduit 304, a proportional valve 306, a flow measurement module 308, a pressure sensor 310, a variable valve 313, a range decision module 314, a flow control 316, a flow set point 320 and a fluid outlet 322. Mass flow controller 300 includes a pressure sensor 310 downstream of a flow measurement module 314 and a dynamically adjustable variable valve 312 further downstream of the pressure sensor 310. An embodiment of the mass flow control controller 300 (FIG. 3) includes a proportional valve 306 upstream of a flow measurement module 308, a pressure sensor 310 fluidly connected to determine a fluid pressure downstream of the flow measurement module 308, and a dynamically adjustable variable valve 312 downstream of both the flow measurement module 308 and the pressure sensor 310. The downstream pressure sensor 310 and variable valve 312 may be used with either a pressure-based or a thermal-based flow sensor. The variable valve 312 may be controllably adjusted (set) to any of at least two different amounts of opening (fluid conductance).

The variable valve 312 may additionally provide a complete shut-off in a third adjustment condition (setting) although this capability is optional. The variable valve 312 may be of a type with a continuously adjustable range of openings. The pressure sensor 310 may be of any convenient type and may optionally further include fluid temperature measuring provisions such as a temperature sensor.

An adjustment decision may be made, and opening of the variable valve 312 consequently adjusted, in response to a magnitude of the determined fluid pressure downstream of the flow measurement module 308 relative to a chosen threshold. The chosen threshold may be selected to ensure the flow measurement module 308 is subjected to at least a minimum (one half atmosphere, for example) determined downstream fluid pressure. Alternatively, in some embodiments, the chosen threshold may be selected to ensure the flow measurement portion is operating in a desired linear regime. The opening of the variable valve 310 may be held relatively constant, and specifically changed according to known limitations of the flow measurement module 308, with intentional hysteresis caused by selecting a new chosen threshold contemporaneous with each specific change of opening. Yet another control scheme may dynamically modulate the adjustment of the variable valve 312 to maintain a relatively constant determined fluid pressure downstream of the flow measurement module 308. In yet another embodiment, the flow controller 316 may use a control scheme to select the chosen threshold based at least in part upon the pressure drop across the flow measurement module 308. In another embodiment, the flow controller 316 may use a control method to select the chosen threshold based at least in part on the change of pressure across the flow measurement module 308. The proportional valve 306 and the variable valve 312 control the flow of the fluid through the mass flow controller 300. The variable valve 312 may be used to help the mass flow controller 300 have a faster step-down response when reducing the flow by more than 50%. In other embodiments, the variable valve 312 may be used to help the mass flow controller 300 have a faster step up response when increasing the flow of the fluid by more than 50%.

Figure 4:
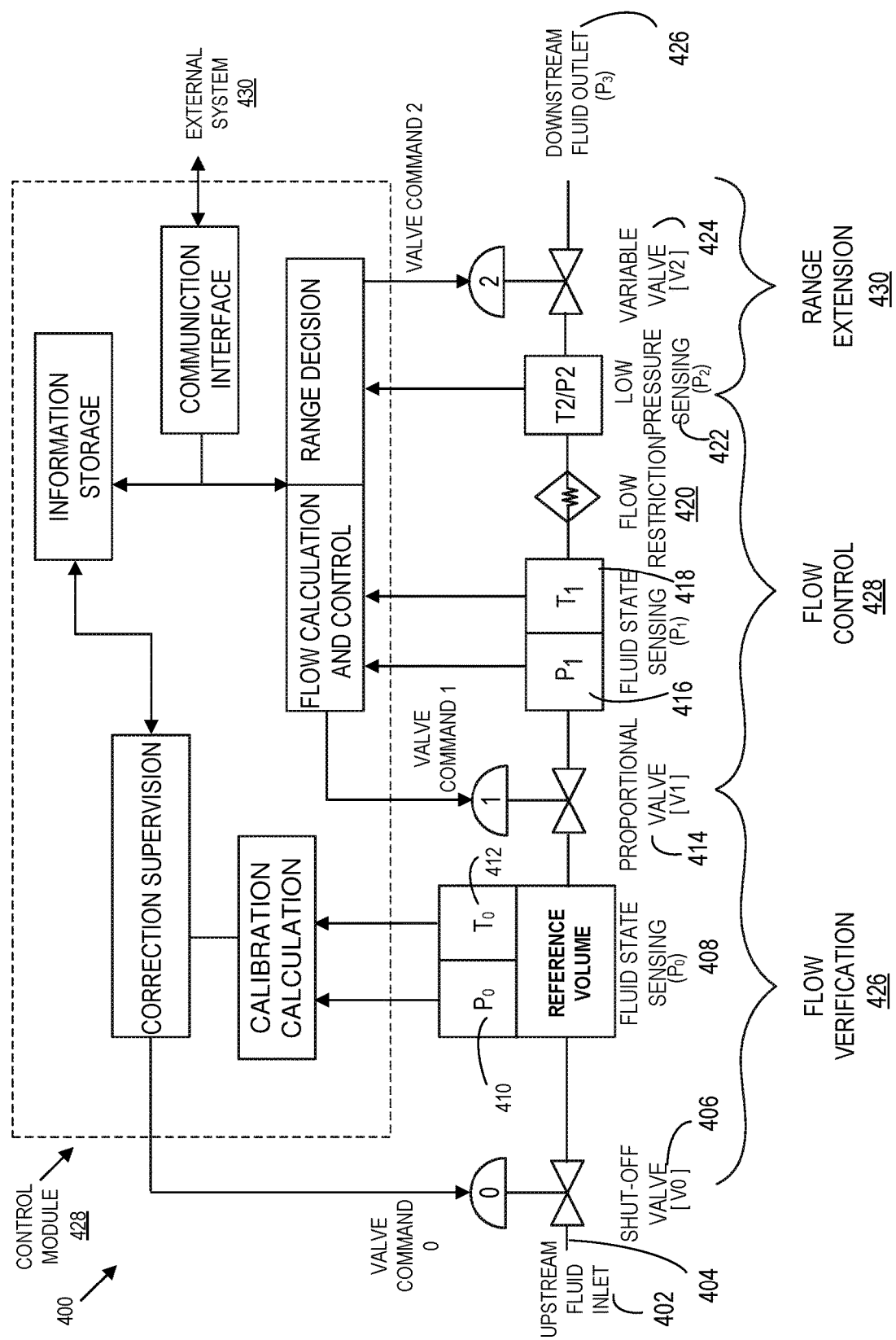
FIG. 4 is a schematic of a mass flow controller that includes a flow verification capability while using a pressure-based flow sensor.

FIG. 4 is a schematic of a mass flow controller 400 that includes a flow verification capability while using a pressure-based flow sensor. The mass flow controller 400 may comprise (in upstream to downstream flow sequence) a fluid inlet 402, to a fluid pathway 404, a controllable shutoff valve 406, provisions for measuring a reference temperature 412 (T0) and a reference pressure 410 (P0) of a fluid contained within a reference volume 408 of the fluid conduit 404, a proportional control valve 414, provisions for measuring a first temperature 418 (T1) and a first pressure 416 (P1) of the fluid contained within the fluid pathway upstream of a flow restriction 420, provisions for measuring a second pressure 422 (P2) of the fluid contained within the fluid pathway downstream of the flow restriction 420, a variable valve 424, and an outlet 426 from the fluid pathway 404. Knowing the aggregate volume of fluid contained within the reference volume 408, plus any directly connected fluid conduit 404 between the shutoff valve 406 and the proportional valve 414, enables flow verification (self-calibration) of the embodiment mass flow controller 400. Flow verification method includes closing the shutoff valve 406 to isolate the fluid conduit 404 from the inlet 402 while controlled mass flow continues through the outlet, making repeated measurements of the reference temperature 410 (T0) and the reference pressure 412 (P0) of the fluid contained within the reference volume 408 of the fluid conduit 404 for a period of time, opening the shutoff valve 406 to re-establish fluid pathway connection to the fluid inlet 402, calculating a verified flow signal using pressure-volume-temperature (PVT, also known as Rate Of Fall, RoF) methods related to the aggregate volume of fluid, and providing the verified flow signal to a supervision function (control module 428). The control module 428 may subsequently choose whether to enable additional self-calibration processes, change a system parameter, merely store the results, or take other actions. For example, the control module 428 may direct that a series of flow verification measurements be performed corresponding to different values of determined fluid pressures (P1, P2) and fluid temperature (T1) adjacent the flow restriction 420. This series of flow verification measurements readily determines a calibration curve, for a discrete flow restriction, based at least in pail upon the verified flow signals. It should be noted the control module 428 does not require any particular critical ratio (P1/P2) be maintained between the determined upstream (P1) and downstream (P2)

pressures when a known calibration curve is obtained. The known calibration curve may be entirely empirical or conform to a theoretical model.

Figure 5:
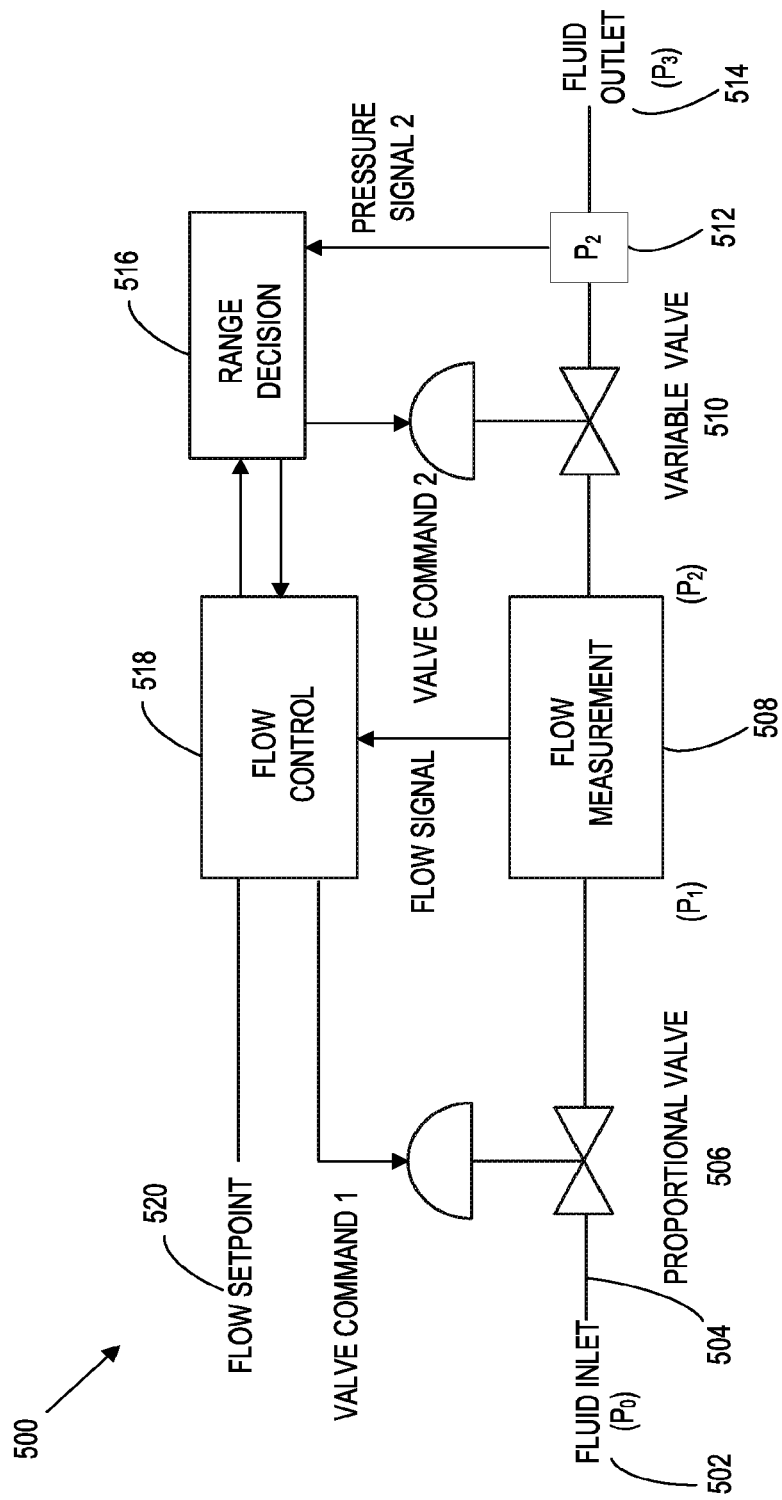
FIG. 5 is a schematic of a mass flow controller that includes a dynamically variable valve downstream of a flow Measurement portion and a pressure sensing element connection further downstream of the variable valve.

FIG. 5 is a schematic of a mass flow controller 500 that includes a dynamically variable valve downstream of a flow measurement module 508 and a pressure sensing element 512 further downstream of the variable valve 510. Another embodiment of a mass flow controller 500 (FIG. 5) includes a proportional valve 506 upstream of a flow measurement portion 508, a dynamically adjustable variable valve 510 downstream of the flow measurement portion, and a pressure sensing element fluidly connected to determine a fluid pressure downstream of the flow measurement portion and the adjustable variable valve. The downstream pressure sensing element 512 and variable valve 510 combination may be used with either a pressure-based or a thermal-based flow sensor. The variable valve 510 may be controllably adjusted (set) to any of at least two different amounts of opening (fluid conductance). The variable valve 510 may additionally provide complete shut-off in a third adjustment condition (setting) although this capability is optional. The variable valve 510 may be of a type with a continuously adjustable range of openings. The pressure sensing element 512 may be of any convenient type and may optionally further include fluid temperature measuring provisions. An adjustment decision may be made by the range decision 516, and opening of the variable valve 510 consequently adjusted, in response to operating conditions of the apparatus as further explained below.

Figure 6:
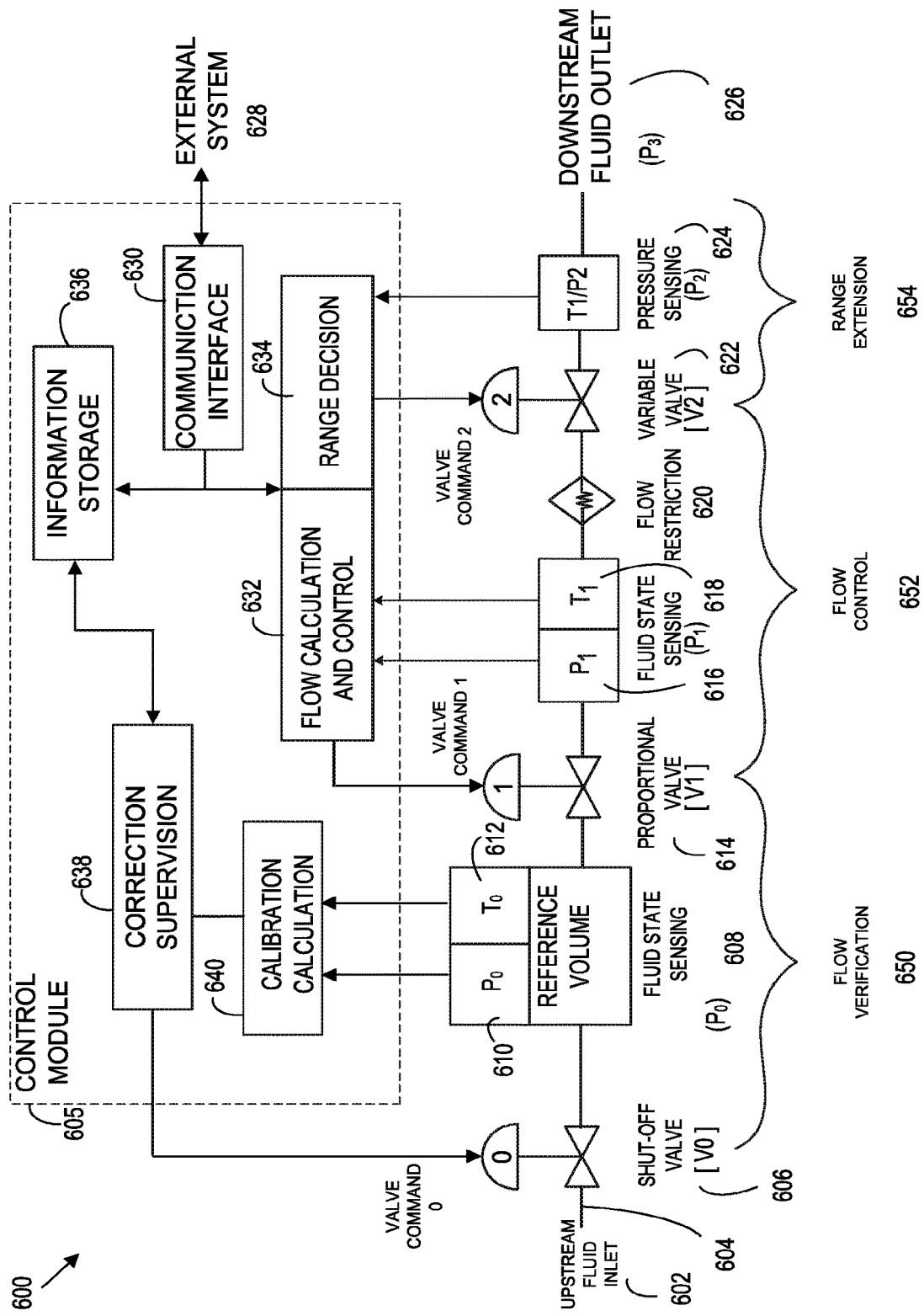
FIG. 6 is a schematic of a mass flow controller that includes a flow verification capability while using a pressure-based flow sensor.

FIG. 6 is a schematic of a mass flow controller 600 that includes a flow verification capability while using a pressure-based flow sensor. In various embodiments, of a mass flow controller 600 may additionally include a flow verification capability (FIG. 6). The mass flow controller 600 includes (in upstream to downstream flow sequence) an inlet 602, a fluid pathway 604, a controllable shutoff valve 606, provisions for measuring a reference temperature 612 (T0) and a reference pressure 610 (P0) of a fluid contained within a reference volume portion 608 of the fluid pathway 604, a proportional control valve 614, provisions for measuring a first temperature 618 (T1) and a first pressure 616 (P1) of the fluid contained within the fluid pathway upstream of a flow restriction 620, the flow restriction 620, a variable valve 622, provisions for measuring a second pressure (second pressure sensor 624) (P2). In various embodiments the second pressure sensor 624 may measure the fluid contained within the fluid pathway 604 downstream of the flow restriction 620 and the variable valve 622, and an outlet from the fluid pathway 604. Knowing the aggregate volume of fluid contained within the reference volume 608, plus any directly connected fluid pathway portions between the shutoff valve 606 and the proportional valve 614, enables flow verification (self-calibration) of another embodiment of the mass flow control apparatus. Flow verification involves closing the shutoff valve 606 to isolate the fluid pathway 604 from the inlet 602 while controlled mass flow continues through the outlet 626, making repeated measurements of the reference temperature 612 (T0) and the reference pressure 610 (P0) of the fluid contained within the reference volume 608 of the fluid pathway 604 for a period of time, opening the shutoff valve 606 to re-establish fluid pathway connection to the inlet 602, calculating a verified flow signal using pressure-volume-temperature (PVT, also known as Rate Of Fall, RoF) methods related to the aggregate volume of fluid, and providing the verified flow signal to a control module 605. The control module 605 may subsequently choose whether to enable additional self-calibration processes, change a system parameter, merely store the results, or take other actions. For example, the control module 605 may direct that a specific valve command be presented to the variable valve 622 and a series of flow verification measurements performed corresponding to different values of determined fluid pressures (P1, P2) and fluid temperature (T1) adjacent the flow restriction 620 and variable valve 622. This series of flow verification measurements readily determines a calibration curve, for a composite flow restriction comprising the original discrete flow restriction plus the partially open variable valve 622, based at least in part upon the verified flow signals.

In various embodiments, the control module 605 may relate to making an adjustment decision using a range decision 634, and adjusting an opening of the variable valve 622 downstream of the flow measurement portion (reference volume 608), in response to a magnitude of one or more determined fluid pressures relative to a chosen threshold. In particular, if the flowing fluid pressure drop across the flow restriction 620 and variable valve 622 (P1-P2) is less than a chosen threshold, then a revised valve command may be presented to the variable valve 622 causing the variable valve 622 to assume a less open more flow restricting condition. A flow verification measurement may then provide a verified flow signal for comparison with calculated mass flow (using P1, T1, P2) through the composite flow restriction (which is comprised of the discrete flow restriction 620 and the variable valve 622) obtained by using a previously obtained calibration curve associated with the particular composite flow restriction 620. If the verified flow signal and calculated mass flow are suitably close to identical (for example, 0.5%), then the variable valve may be considered as having returned to a known condition and the supervision function may affirm use of the previously obtained calibration curve with the particular composite flow restriction. It should be noted the control module does not require any particular critical ratio (P1/P2) be maintained between the determined upstream first (P1) and downstream second (P2) pressures when a known calibration curve has been obtained. The known calibration curve may be entirely empirical or conform to a theoretical model.

In low flow and low set point applications additional advantages may be obtained from a variable valve 622 that is additionally able to provide complete shut-off in a third adjustment condition (setting). In any of the previously described embodiments a lower auto-shutoff threshold (for example, 0.25% of full-scale) may be provided to the flow control portion of a mass flow controller such that a set point request less than the auto-shutoff threshold causes the flow control portion to immediately command the proportional valve to its most flow restricting condition without need to obtain a calculated mass flow. Similarly, a variable valve capable of shutoff may be simultaneously commanded to close completely and thereby bring fluid flow to a very rapid halt. In the situation of embodiments (FIG. 3 & FIG. 4) wherein the downstream second pressure (P2) is determined immediately adjacent to the discrete flow restriction, and upstream of the variable valve (described above), then a variable valve having a continuously adjustable range of openings may be advantageously used to control the pressure drop (P1-P2) across the flow restriction while the proportional valve is commanded into its most flow restricting or other convenient condition.

Figure 7:
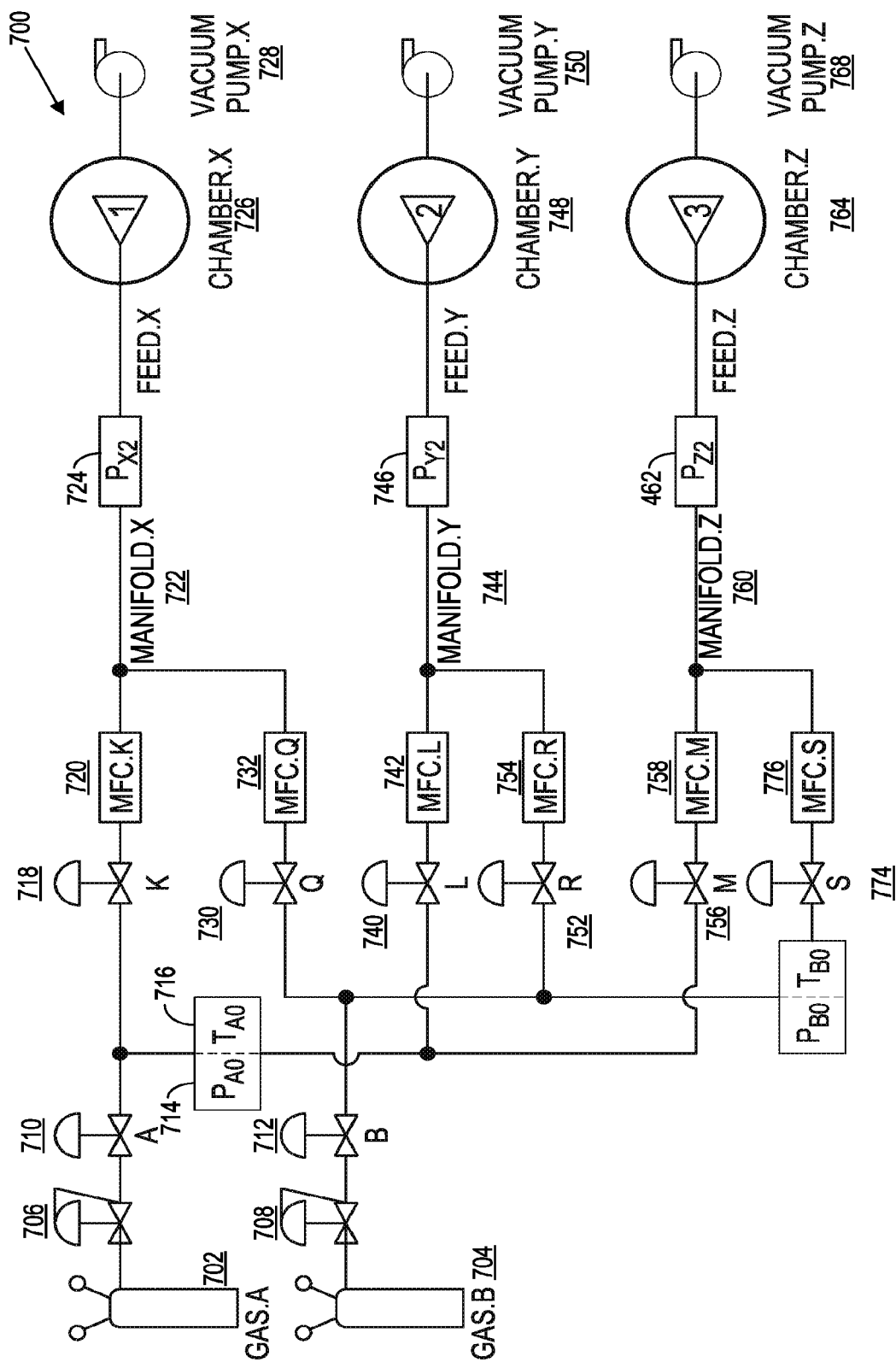
FIG. 7 is an illustration showing portions of a complex fluid delivery system within a single large apparatus for processing semiconductor devices.

FIG. 7 is an illustration showing portions of a complex fluid delivery system within a single large apparatus for processing semiconductor devices. Illustrated in FIG. 7 is an abbreviated schematic illustrating portions of a complex fluid delivery system within a single large apparatus for processing semiconductor devices. A plurality of new embodiment mass flow controllers (of the type illustrated in FIG. 5 & FIG. 6) may be used with a plurality of process gas species to feed reactants into a plurality of vacuum chambers. Such an apparatus is often referred to as a "tool." As shown in the abbreviated schematic, a group ("pallet") of mass flow controllers (MFC.K, MFC.L) enable the simultaneous combination of several different process gases (GAS.A, GAS.B) into a single manifold (MANIFOLD.X) which feeds a gas distribution structure ("showerhead"-1) inside a vacuum chamber (CHAMBER.X). Insufficient conductance in some manifold plumbing (FEED.X) may result in the downstream pressure (Px2), of a particular group of mass flow controllers, becoming too high to maintain choked flow conditions within one or more mass flow controllers within the group. In an alternative scenario, the downstream pressure (Px2) within the manifold (MANIFOLD.X) may be so low the requisite operating conditions internal to a specific new embodiment mass flow controller (e.g. MFC.K) cannot be maintained as desired and the corresponding variable valve within the MFC adjusted as previously discussed. The pressure within the manifold may be monitored (Px2) and a corresponding signal provided to all mass flow controllers within the group (MFC.K, MFC.Q) as an alternative to each mass flow controller having a separate third pressure sensor. Individual mass flow controller adjustment decisions may then proceed based upon the shared third pressure sensor signal. Each individual new embodiment mass flow controller may contain a dedicated supervision function which determines a course of action or a supervision function may be associated with and shared among all new embodiment mass flow controllers comprising a specific pallet group of MFCs.

A mass flow control apparatus comprising: a proportional valve upstream of a flow measurement portion, a pressure sensing element fluidly connected to determine a fluid pressure downstream of the flow measurement portion and a dynamically adjustable variable valve downstream of both the flow measurement portion and the pressure sensing element connection. Further the mass flow control apparatus comprising of a pressure-based flow sensor including a fluid conduit with fluidly coupled pressure and temperature sensing provisions upstream of a known flow restriction. Alternatively, the mass flow control apparatus includes a thermal-based flow sensor, which has fluid conduit with two spaced apart temperature responsive elements affixed to the exterior of the fluid conduit. Further the dynamically adjustable variable valve can be adjusted to any of at least two different amounts of openings, or continuously adjusted to a range of openings or adjusted to a provide a complete shut-off position.

A mass flow control apparatus includes, an inlet to a fluid pathway; a controllable shutoff valve, the controllable shut-off valve providing provisions for measuring a reference temperature (T0) and a reference pressure (P0) of a fluid contained within a reference volume of the fluid pathway; a proportional control valve, the proportional control valve providing provisions for measuring a first temperature (T1) and a first pressure (P1) of the fluid contained within the fluid pathway upstream of a flow restriction; the flow restriction providing provision for measuring a second pressure (P2) of the fluid contained within the fluid pathway downstream of the flow restriction; a variable valve; and an outlet from the fluid pathway. The flow restriction is chosen from group comprising of an orifice, a nozzle, a porous sintered metal element or a laminar flow structures. Further the mass flow control apparatus includes a supervision function. The supervision function may choose an action from group comprising of self-calibration process, change of system parameter or storage of results.

A mass flow control apparatus including a mass flow controller further which includes a proportional valve upstream of a flow measurement portion; a dynamically adjustable variable valve downstream of the flow measurement portion; a pressure sensing element fluidly connected to determine a fluid pressure downstream of the flow measurement portion and downstream of the variable valve. The mass flow control apparatus including the plurality of mass flow controllers; a plurality of gas species to feed reactants into a plurality of vacuum chambers.

A mass flow control apparatus including an inlet to a fluid pathway; a controllable shutoff valve, the controllable shutoff valve providing provisions for measuring a reference temperature (T0) and a reference pressure (P0) of a fluid contained within a reference volume of the fluid pathway; a proportional control valve, the proportional control valve providing provisions for measuring a first temperature (T1) and a first pressure (P1) of the fluid contained within the fluid pathway upstream of a flow restriction; the flow restriction, a variable valve providing provision for measuring a second pressure (P2) of the fluid contained within the fluid pathway downstream of the flow restriction and downstream of the variable valve; and an outlet from the fluid pathway.

A method for a mass flow control apparatus including determining a fluid pressure downstream of a flow sensor; responding to the fluid pressure downstream; and adjusting dynamically a variable valve downstream of the flow sensor to maintain desired operating conditions in the flow sensor; and maintaining and extending the useful operating range of the mass flow control apparatus. The method further includes a flow verification capability. The method further wherein the flow verification capability comprises the steps of: closing a shutoff valve to isolate a fluid pathway from an inlet while controlled mass flow continues through an outlet; making repeated measurements of a reference volume of a fluid pathway for a period of time; opening the shutoff valve to re-establish fluid pathway connection to the inlet; calculating a verified flow signal using pressure-volume-temperature methods; and providing a verified flow signal to a supervision function. Wherein the supervision function directs that a series of flow verification measurements be performed corresponding to different values of determined fluid pressures and fluid temperatures adjacent the flow restriction. Wherein the supervision function determines a calibration curve for a discrete flow restriction based on the flow signals generated by the flow verification measurements.

Referring to FIG. 7, FIG. 7 shows an apparatus 700 having a plurality of self-correcting mass flow controllers may be used with a plurality of gas species fed to a plurality of vacuum chambers 726, 748, and 764 for processing semiconductor devices within a single large apparatus often referred to as a "tool." A group ("pallet") of mass flow controllers (720, 732, 742, 754, 758, and 776) allow the simultaneous combination of several different gases into a single manifold (742, 744, and 760) which feeds a gas distribution structure ("showerhead") inside a vacuum chamber (726, 748 and 764). Insufficient conductance in the manifold plumbing may result in the downstream pressure, of a particular group of mass flow controllers, becoming too high to maintain choked flow conditions within one or more mass flow controllers within the group. The pressure within the manifold may be monitored using pressure sensor 724, pressure sensor 746 and pressure sensor 762 and a corresponding signal provided to all mass flow controllers within the group as an alternative to each mass flow controller having a separate third pressure sensor. Individual mass flow controller self-correction may then proceed based upon the shared third pressure sensor signal or according to commands emanating from the tool master control (a control system external to the control module of each mass flow controller).

FIG. 7 illustrates an apparatus 700 that includes various system including, a gas provider 702 and a gas provider 704. The apparatus 700 has a plurality of valves, 706, 708, 710, 712, 718, 730, 740, 752, 756, and 774. The apparatus 700 includes one or more pressure sensors to determine the flow rate of the gases. The pressure sensors 714, 716, 724, 746, 762, 770, and 772 may be used to determine the pressure outside of the MFCs 720, 732, 742, 754, 758, and 776.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

The invention claimed is:

1. A mass flow control apparatus comprising:
a control module configured to receive one or more set point flow rates for delivering a fluid delivery to a tool;
a variable control valve configured to constrict sufficiently to increase a pressure of a fluid from a flow restrictor to be higher than a back pressure from the tool responsive to the control module receiving a second set point flow rate that is different than a first set point flow rate; and
a proportional control valve located upstream from the flow restrictor to adjust the pressure to the flow restrictor.

2. The mass flow control apparatus of claim 1, wherein the variable control valve is a solenoid-type valve.

3. The mass flow control apparatus of claim 1, wherein the proportional control valve is a solenoid-type valve.

4. The mass flow control apparatus of claim 1, wherein the proportional control valve is configured to adjust the pressure to the flow restrictor such that the pressure drop across the flow restrictor yields a flow rate that is equal to the second set point flow rate.

5. The mass flow control apparatus of claim 1, further comprising a reference volume configured to verify an actual flow rate by closing a fluid flow using a shut-off valve and measuring a pressure rate of decay in the reference volume;
wherein at least one of the variable control valve and the proportional control valve is configured to be adjusted until the second set point flow rate is achieved.

6. The mass flow control apparatus of claim 1, further comprising a thermal-based flow sensor.

7. The mass flow control apparatus of claim 6, wherein the thermal-based flow sensor includes a fluid conduit with two spaced apart temperature responsive elements affixed to an exterior of the fluid conduit.

8. The mass flow control apparatus of claim 1, wherein the mass flow control apparatus is configured to perform a supervision function.

9. The mass flow control apparatus of claim 1, wherein the variable control valve can be adjusted to any of at least two different amounts of openings.

10. The mass flow control apparatus of claim 1, wherein the variable control valve can be continuously adjusted to a range of openings.

11. The mass flow control apparatus of claim 1, wherein the variable control valve can be adjusted to provide a complete shut-off position.

12. The mass flow control apparatus of claim 1, further comprising a first pressure sensor, a first temperature sensor and a shut-off valve, wherein:
the first pressure sensor is configured to measure a fluid pressure (P0) of a reference volume downstream from the shut-off valve;
the first temperature sensor is configured to measure a temperature (T0) of the reference volume;
the proportional control valve provides provisions for measuring a second temperature (T1) and a second pressure (P1) of the fluid contained within a fluid pathway upstream of the flow restrictor; and
the flow restrictor provides a provision for measuring a third pressure (P2) of the fluid contained within the fluid pathway downstream of the flow restrictor.

13. The mass flow control apparatus of claim 1, wherein the flow restrictor is chosen from a group consisting of an orifice, a nozzle, a porous sintered metal element, and laminar flow structures and tubes.

14. A mass flow control apparatus comprising:
a control module configured to receive one or more set point flow rates for delivering a fluid delivery to a tool;
a variable control valve configured to constrict sufficiently to increase a pressure of a fluid from a flow restrictor to be higher than a back pressure from the tool responsive to the control module receiving a second set point flow rate that is different than a first set point flow rate;
a proportional control valve located upstream from the flow restrictor to adjust the pressure to the flow restrictor; and
a pressure sensor for measuring pressure of a fluid.

15. The mass flow control apparatus of claim 14, wherein the pressure sensor is located upstream of the variable control valve.

16. The mass flow control apparatus of claim 14, wherein the pressure sensor is configured to measure a pressure in a reference volume portion.

17. The mass flow control apparatus of claim 14, wherein the pressure sensor is configured to measure a pressure of the fluid when at least one of a shut-off valve and the variable control valve is closed.

18. A mass flow control apparatus comprising:
a control module configured to receive one or more set point flow rates for delivering a fluid delivery to a tool;
a variable control valve configured to constrict sufficiently to increase a pressure of a fluid from a flow restrictor to be higher than a back pressure from the tool responsive to the control module that is configured to receive a second set point flow rate that is different than a first set point flow rate;
a proportional control valve located upstream from the flow restrictor to adjust the pressure to the flow restrictor;
a pressure sensor located upstream of the variable control valve to measure a pressure of a fluid; and
a shut-off valve to close an inlet supply,
wherein the pressure sensor is configured to measure the pressure of the fluid while the shut-off valve is closed.

19. The mass flow control apparatus of claim 18, further comprising a temperature sensor to measure a temperature of a fluid.

20. The mass flow control apparatus of claim 18, wherein the control module is configured to enable additional self-calibration processes, change a system parameter, and store results.

\* \* \* \* \*